United States Patent [19]

Ibuchi et al.

[11] Patent Number: 5,298,942
[45] Date of Patent: Mar. 29, 1994

[54] COPYING APPARATUS HAVING LIQUID CRYSTAL CELLS

[75] Inventors: Yoshiaki Ibuchi, Nara; Akira Tamagaki, Soraku; Naoyuki Kamei; Yoshigumi Maitani, both of Yamatokoriyama, all of Japan

[73] Assignee: Sharp Kabushiki Kaisha, Osaka, Japan

[21] Appl. No.: 954,394

[22] Filed: Sep. 30, 1992

[30] Foreign Application Priority Data

| Nov. 20, 1991 | [JP] | Japan | 3-304777 |
| Nov. 25, 1991 | [JP] | Japan | 3-309359 |
| Nov. 25, 1991 | [JP] | Japan | 3-309360 |
| Nov. 27, 1991 | [JP] | Japan | 3-312693 |
| Dec. 4, 1991 | [JP] | Japan | 3-302675 |
| Dec. 4, 1991 | [JP] | Japan | 3-320676 |

[51] Int. Cl.⁵ .................... G03G 15/04; G03G 21/00
[52] U.S. Cl. ........................ 355/202; 355/228
[58] Field of Search ............ 355/200, 202, 210, 228, 355/229

[56] References Cited

U.S. PATENT DOCUMENTS

| 3,533,339 | 10/1970 | Bigelow | 355/326 X |
| 3,778,149 | 12/1973 | Fields | 355/210 |
| 3,824,604 | 7/1974 | Stein | 355/40 X |
| 4,080,058 | 3/1978 | Stephany et al. | 355/202 |
| 4,315,684 | 2/1982 | Sugiura et al. | 358/300 X |
| 4,632,538 | 12/1986 | Lemelson et al. | 355/244 |
| 4,659,210 | 4/1987 | Subiura et al. | 346/160 |
| 4,989,038 | 1/1991 | Kobayashi et al. | 355/202 |
| 5,038,166 | 8/1991 | Isaka et al. | 355/27 |
| 5,099,273 | 3/1992 | Yamamoto et al. | 355/27 |

*Primary Examiner*—Fred L. Braun
*Attorney, Agent, or Firm*—David G. Conlin; George W. Neuner

[57] ABSTRACT

An image forming apparatus includes a drum having a hollow polyhedron cylinder of which facets have windows. A liquid crystal cell is attached to each window of the drum for receiving image light from out side the drum on the one surface thereof to pick up a document image therein, and for receiving second light on the back surface thereof inside the drum to cause the image to be read out. The drum is rotated so that the liquid crystal cell provided on each window of the drum can sequentially receive first light reflected by the document on the one surface thereof out side the drum and second light irradiated by a second irradiating device on the back surface thereof inside the drum. A photoreceptor for receiving second light reflected by the back surface of the liquid crystal cell forms an electrostatic latent image corresponding to a document image, which is developed, transferred onto a copy paper and fixed.

11 Claims, 20 Drawing Sheets

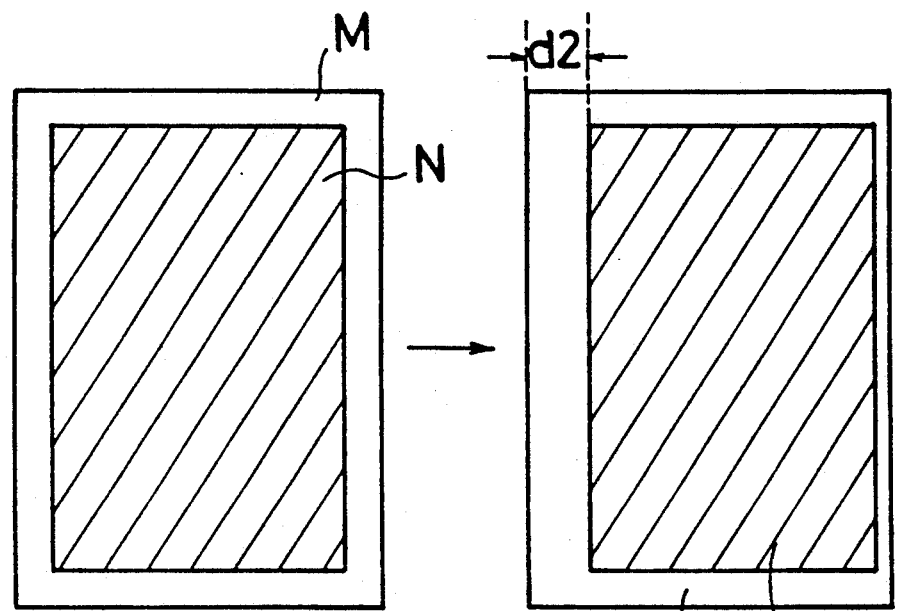
FIG.13A
FIG.13C
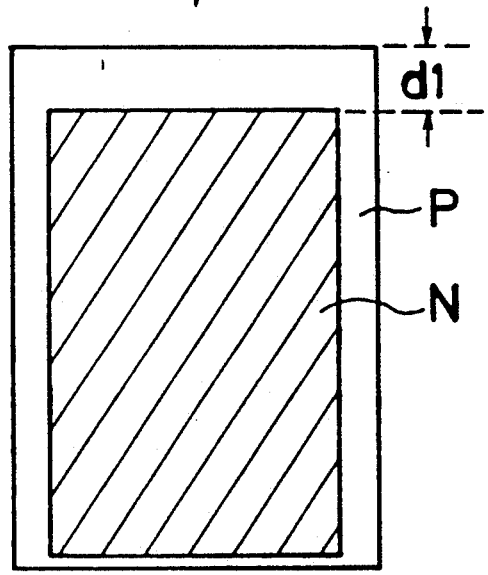
FIG.13B

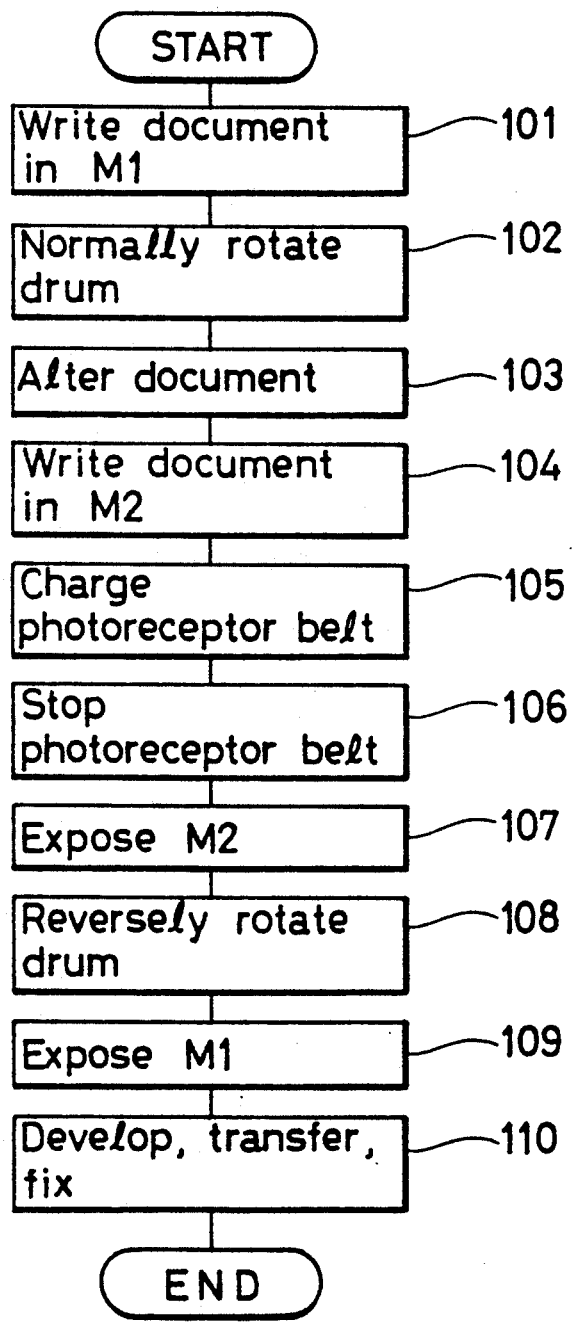

COPYING APPARATUS HAVING LIQUID CRYSTAL CELLS

FIELD OF THE INVENTION

The present invention relates to an image forming apparatus for reading out information written in an image memory and printing the same on a paper.

DESCRIPTION OF THE RELATED ART

There has been conventionally known an image forming apparatus in which information written or retained in an image memory is read out and converted into electric signals, laser beams modulated by the electric signals form latent images on a photoreceptor, and the latent images thus formed are developed with toner and then transferred onto a copy paper (for example, see U.S. Pat. Nos. 4,505,576, 4,733,275 and 4,843,428).

However, the above-mentioned image forming apparatus has a disadvantageously complicated structure because the information written in the image memory is once converted into the electric signal, the laser beams are modulated by the electric signal and the latent images are formed on the photoreceptor by the laser beams, wherein a series of photoelectric processings are involved.

SUMMARY OF THE INVENTION

The present invention provides an image forming apparatus comprising a document table for placing a document to be copied thereon, first irradiating means for irradiating first light onto the document on the document table and reflecting the same, a drum including a hollow polyhedron cylinder of which facets have windows, a liquid crystal cell (in the following, this screen will often be shortened to "liquid crystal cell") attached to each window of the drum for receiving image light on one surface thereof to read or pick up a document image therein, and for receiving second light on the back surface thereof to cause the image to be read out, second irradiating means for irradiating second light onto the back surface of the liquid crystal cell and reflecting the same, drum driving means for rotating the drum so that the liquid crystal cell provided on each window of the drum can sequentially receive first light reflected by the document on the one surface thereof and second light irradiated by the second irradiating means on the back surface thereof, a photoreceptor for receiving second light reflected by the back surface of the liquid crystal cell to form an electrostatic latent image corresponding to a document image, developing means for developing the electrostatic latent image, transferring means for transferring the developed image onto a copy paper, and fixing means for fixing the transferred image.

It is preferred that the polyhedron cylinder is made movable in the direction of a rotational shaft of the drum.

Preferably, the drum has an opening provided on one of sides for guiding-in the second light from the second irradiating means to the back surface of the liquid crystal cell screen, and another opening provided on the other side for guiding-out light reflected by the back surface of the liquid crystal cell to the photoreceptor.

The photoreceptor may be formed like an endless belt, and a face for receiving the light reflected by the back of the liquid crystal cell may be provided in a direction perpendicular to the document table.

It is preferred that the image forming apparatus further comprises conversion means for receiving the light reflected by the back of the liquid crystal cell so as to convert the image of the liquid crystal cell into an electric signal, and display means for receiving the output of the conversion means so as to display the image.

The image forming apparatus may further comprise a first zoom lens having variable magnifications for forming the image of the light reflected by the document on the liquid crystal cell, and a second zoom lens having variable magnifications for forming the image of the light reflected by the liquid crystal cell on the photoreceptor.

The image forming apparatus may further comprise moving means for moving the polyhedron in the axial direction of the drum, and control means for priorly rotating the drum by a predetermined angle or moving the polyhedron by a predetermined distance when an electrostatic latent image is formed on the photoreceptor by the image of the liquid crystal cell.

The image forming apparatus may further comprise control means for rotating the drum so as to read a plurality of document images in a plurality of liquid crystal cell, and rotating the drum during the process of read-out so that electrostatic latent images corresponding to a plurality of liquid crystal cell images are superposed on the photoreceptor.

The image forming apparatus may further comprise control means for reading out the image of the liquid crystal cell onto the photoreceptor and transferring the same onto the paper in predetermined order after a plurality of documents are sequentially read in the liquid crystal cell.

The image forming apparatus may further comprise paper inverting or turning-back means for inverting the fixed paper and feeding the same to the transferring means, and control means for reading out the image of the liquid crystal cell onto the photoreceptor and transferring the same onto both sides of the paper after a plurality of documents are sequentially read in the liquid crystal cell.

The image forming apparatus may further comprise paper feeding means for feeding the fixed paper to the transferring means, and control means for reading out the image of the liquid crystal cell onto the photoreceptor and superposing a plurality of images to be transferred onto the paper after a plurality of documents are sequentially read in the liquid crystal cell.

BRIEF DESCRIPTION OF THE DRAWINGS

FIGS. 13A to 13C are views showing the relationship between a paper and copied images according to the embodiment of the present invention wherein FIG. 13A illustrates the image N on the liquid crystal cell M, FIG. 13B illustrates the image N copied on a paper P with a positional shift to provide a binding margin d1, and 13C illustrates image N copied on a paper P with a positional shift to provide a binding margin d2.

FIGS. 14 to 19 are flow charts showing operations according to the embodiment of the present invention;

DETAILED DESCRIPTION OF THE PREFERRED EMBODIMENT

A preferred embodiment of the present invention will be described in detail with reference to the drawings. The present invention should not be construed as being limited by the following embodiment.

Figure 1:
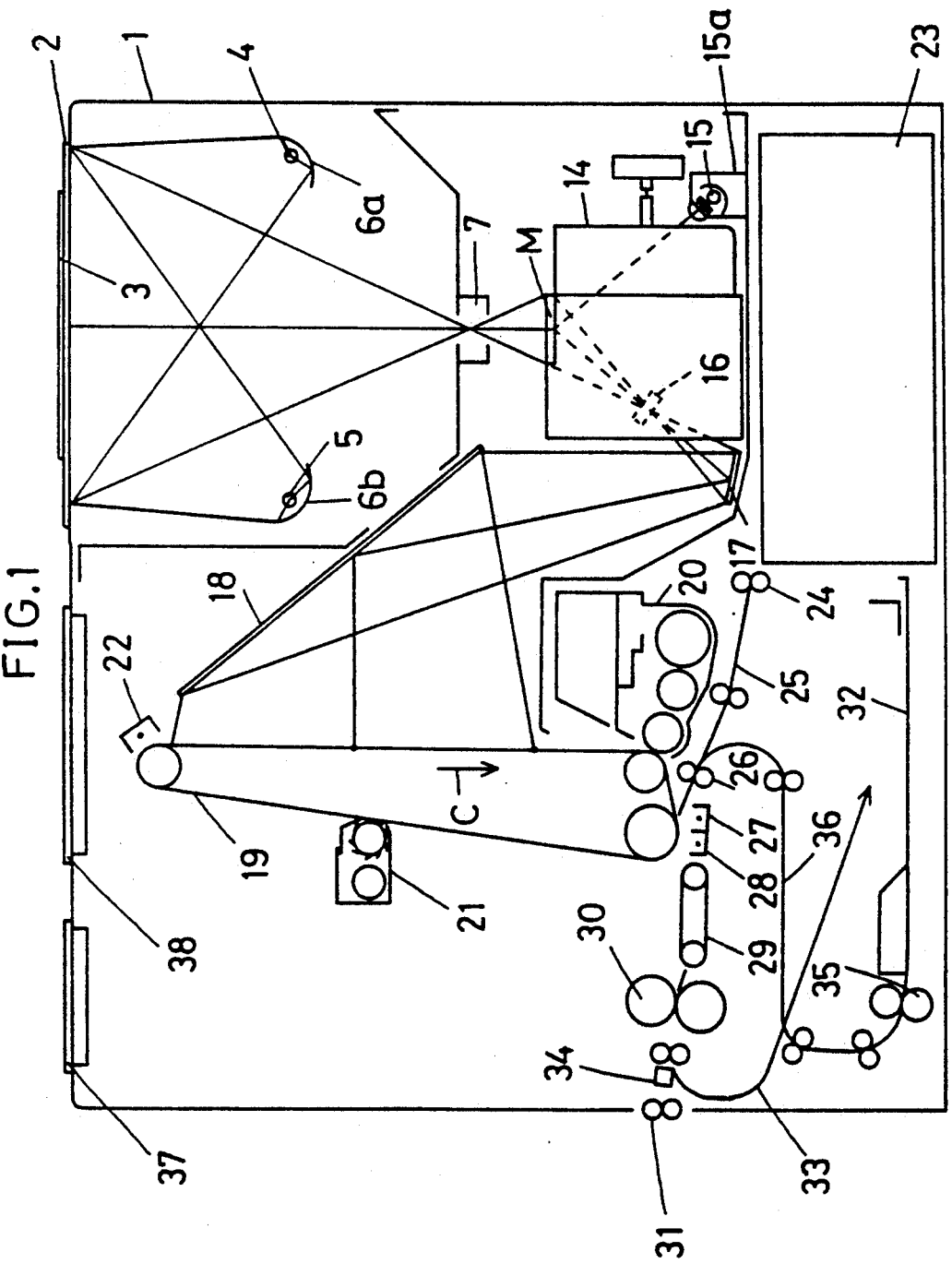
FIG. 1 is a view showing the structure of an image forming apparatus according to an embodiment of the present invention.

FIG. 1 is a view showing the structure of an image forming apparatus according to the embodiment of the present invention. In FIG. 1, the reference numeral 1 denotes an image forming apparatus body, the reference numeral 2 denotes a document table for placing a document 3 thereon. The document table 2 is a transparent glass plate. The reference numerals 4 and 5 denote document irradiating lamps for irradiating the document 3. The reference numerals 6a and 6b denote reflecting mirrors. The reference designation M denotes a liquid crystal cell. The reference numeral 7 denotes a zoom lens for forming the image of image light reflected by the document 3 on the surface of the liquid crystal cell M and writing the same in the liquid crystal cell M.

Figure 9:
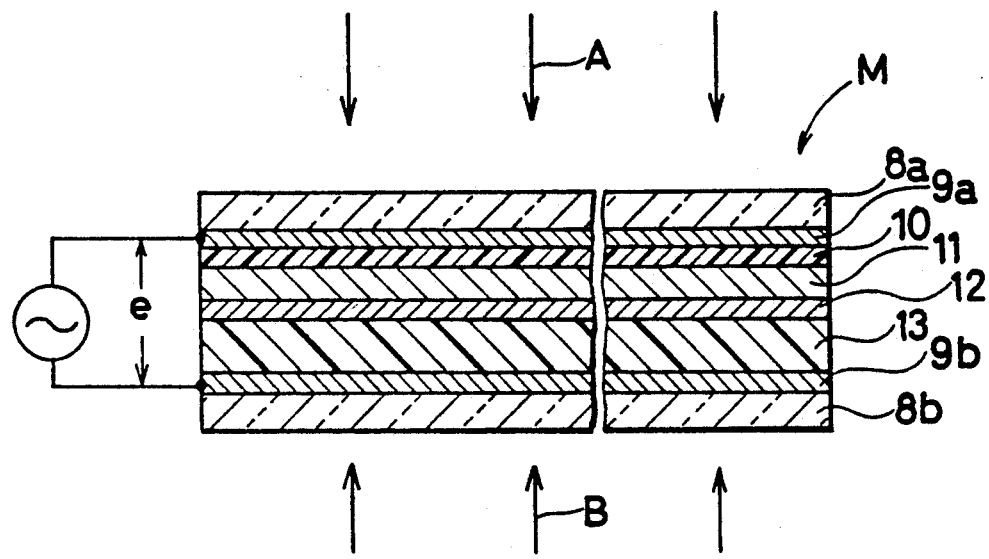
FIG. 9 is a view showing the structure of a liquid crystal cell according to the embodiment of the present invention.

As shown in FIG. 9, the liquid crystal cell M includes glass substrates 8a and 8b, transparent electrodes 9a and 9b, a photoconductive layer 10, a light block layer 11, a reflecting film 12, and a liquid crystal layer 13. An a.c. voltage e is applied to the transparent electrodes 9a and 9b.

The photoconductive layer 10 is selected so that resistances per unit area with and without light irradiation, i.e., a bright resistance R (ON) and a dark resistance R (OFF) having the following relationship with a resistance R (LC) per unit area of the liquid crystal layer 13.

$$R(OFF) > R(LC) > R(ON)$$

When light is not irradiated, most of the voltage e is applied to the photoconductive layer 10 so that electro-optical effects are not produced on the liquid crystal layer 13. When the light is irradiated onto the photoconductive layer 10, the resistance of the photoconductive layer 10 is reduced and a voltage becomes effective, that is, the voltage is applied to the liquid crystal layer 13. Consequently, the electro-optical effects at 13 are produced.

R (ON) depends on the intensity of irradiated light. Consequently, the voltage applied to the liquid crystal layer 13 also depends on the intensity of the irradiated light. Accordingly, there can also be obtained an analog response corresponding to the type of electro-optical effects of the liquid crystal layer 13.

In case the light irradiated onto the photoconductive layer 10 is image information having intensity distribution, voltage distribution corresponding to the intensity distribution is applied to the liquid crystal layer 13 and an image corresponding to an incident image is brought out on the liquid crystal layer 13 by electro-optical effects.

Most generally, CdS is used for the photoconductive layer 10. There can also be used ZnS, ZnO, Se, SeTe, a thin amorphous silicon film and the like.

Examples of the liquid crystal layer 13 include N-(4-methoxybenzylidene)-4-n-butylaniline (MBBA) and other nematic liquid crystals.

As shown in FIG. 9, when a writing voltage is applied between the transparent electrodes 9a and 9b and image light is irradiated in a direction of an arrow A, an image is written in the liquid crystal layer 13. Even if the writing voltage is removed, the written image is retained or stored on the liquid crystal layer 13. The image thus retained can be read out when light is irradiated in a direction of an arrow B.

In that case, even if the light is irradiated in the direction of an arrow B, the formed image is not changed. Consequently, it is possible to read out the formed image several times or repeatedly. In case the formed image is unnecessary and a new image is to be formed, an erasing voltage is applied between the transparent electrodes 9a and 9b so as to erase the formed image.

As shown in FIG. 1, the liquid crystal cell M is provided on a drum 14. An image is written by image light from the zoom lens 7. Light is irradiated by the liquid crystal irradiating lamp 15 so that the image is read out. The reference numeral 15a denotes a lamp house, the reference numeral 16 denotes a projection zoom lens, the reference numerals 17 and 18 denote mirrors, and the reference numeral 19 denotes a photoreceptor belt (an endless belt).

Image light (reflected light) read out from the liquid crystal cell M is irradiated onto the photoreceptor belt 19 through the mirrors 17 and 18 so that an electrostatic latent image is formed by the projection zoom lens 16.

In order to effectively use the space of the body 1, the photoreceptor belt 19 is provided so that a face for receiving the reflected light from the liquid crystal cell M is set to be perpendicular to the document table 2.

The reference numeral 20 denotes a developing unit for developing an electrostatic latent image formed on the photoreceptor belt 19 with toner. The reference numeral 21 denotes a cleaner for recovering and removing toner and static charges which remain on the photoreceptor belt 19. The reference numeral 22 denotes an electrostatic charger for uniformly charging the photoreceptor belt 19. The reference numeral 23 denotes a housing for housing papers. The reference numeral 24 denotes a paper feeding roller for feeding papers from the housing 23. The reference numeral 25 denotes a delivery path through which the papers are delivered from the housing 23 toward the photoreceptor belt 19. The reference numeral 26 denotes a resist roller for determining the delivery timing of the papers relative to the moving position of the photoreceptor belt 19.

The reference numeral 27 denotes a transferring charger for transferring a toner image from the photoreceptor belt 19 onto a paper. The reference numeral 28 denotes a separating charger for separating the paper from the photoreceptor belt 19. The reference numeral 29 denotes a delivery belt for delivering the paper. The reference numeral 30 denotes a fixing roller for fixing an image on the paper. The reference numeral 31 denotes a paper discharging roller for discharging the paper. The reference numeral 32 denotes a housing for temporarily storing copied papers. The reference numeral 33 denotes a delivery path through which the copied papers are delivered to the housing 32 with both sides thereof inverted. The reference numeral 34 denotes a switching unit for switching the delivery path. The reference numeral 35 denotes a paper feeding roller for feeding the papers out of the housing 32. The reference numeral 36 denotes a delivery path through which the papers in the housing 32 are delivered to the resist roller 26. The paper is fed to the resist roller 26 through the paper feeding roller 35 and delivery path 36.

The reference numeral 37 denotes a console panel which includes a keyboard for setting various copying conditions. The reference numeral 38 denotes a display panel which includes a liquid crystal display for displaying the copying conditions set-up, document images and the like.

Figure 2:
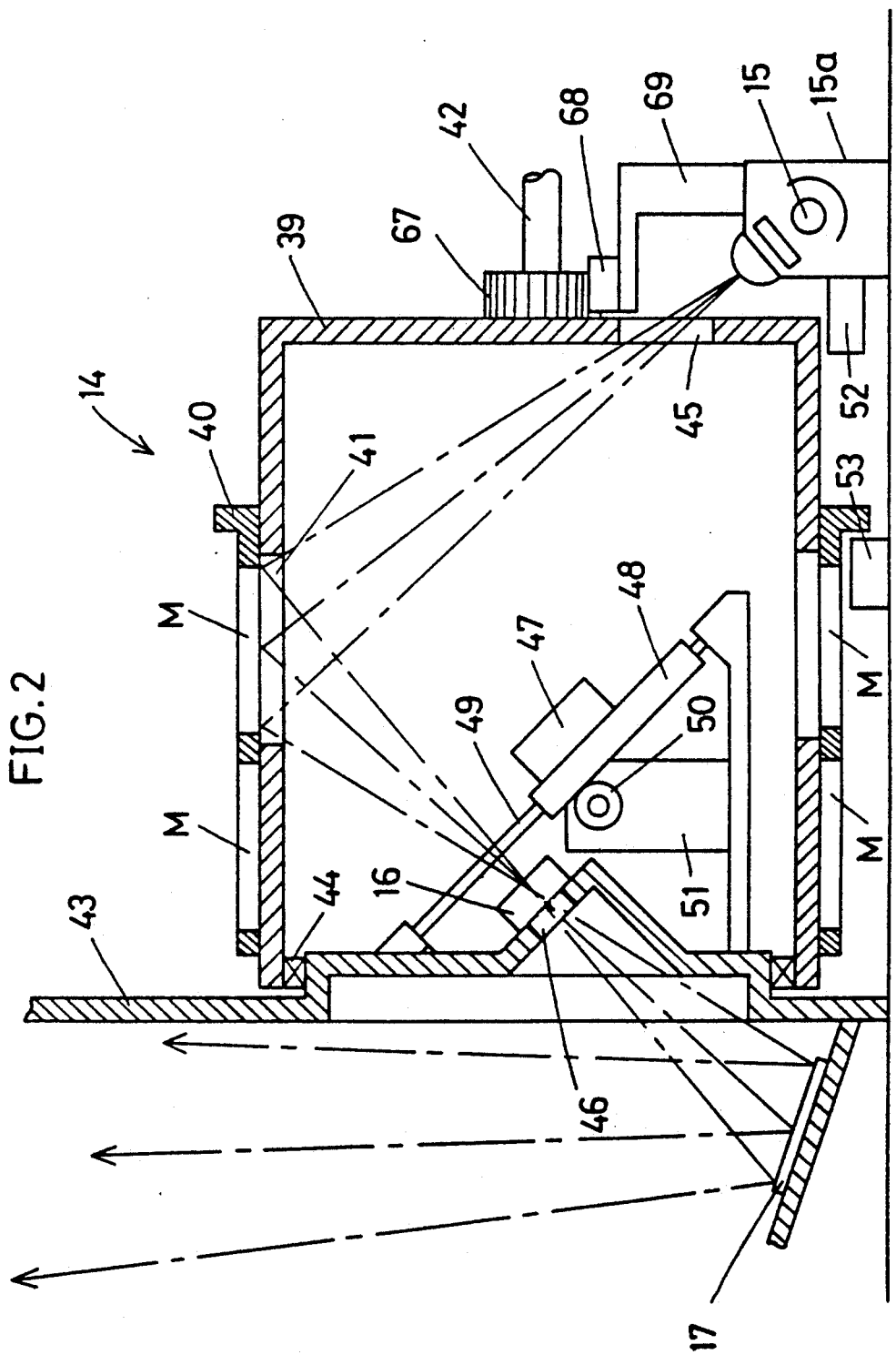
FIG. 2 is a section view showing a drum according to the embodiment of the present invention.
Figure 4:
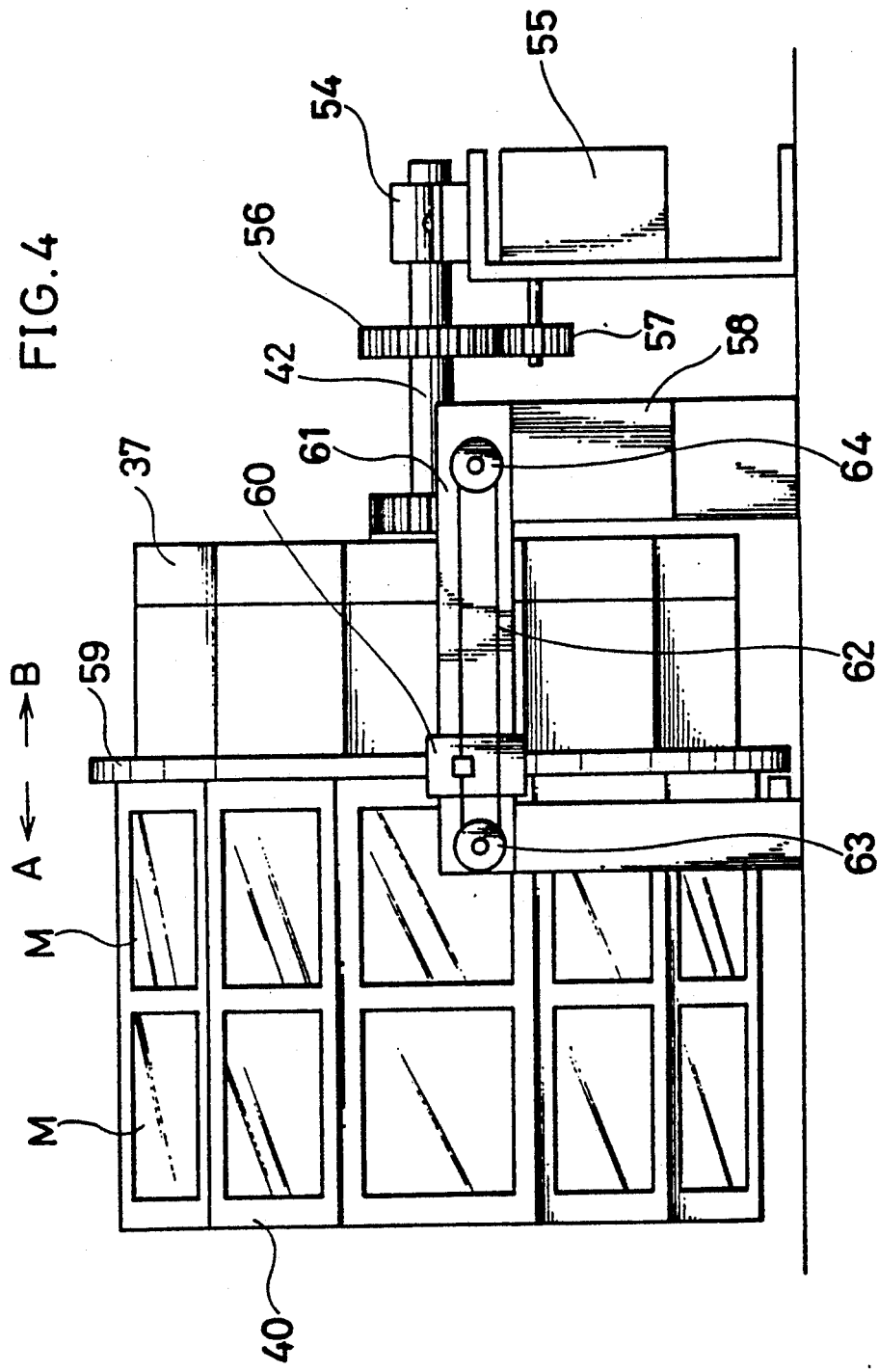
FIG. 4 is a side view showing the drum according to the embodiment of the present invention.
Figure 5:
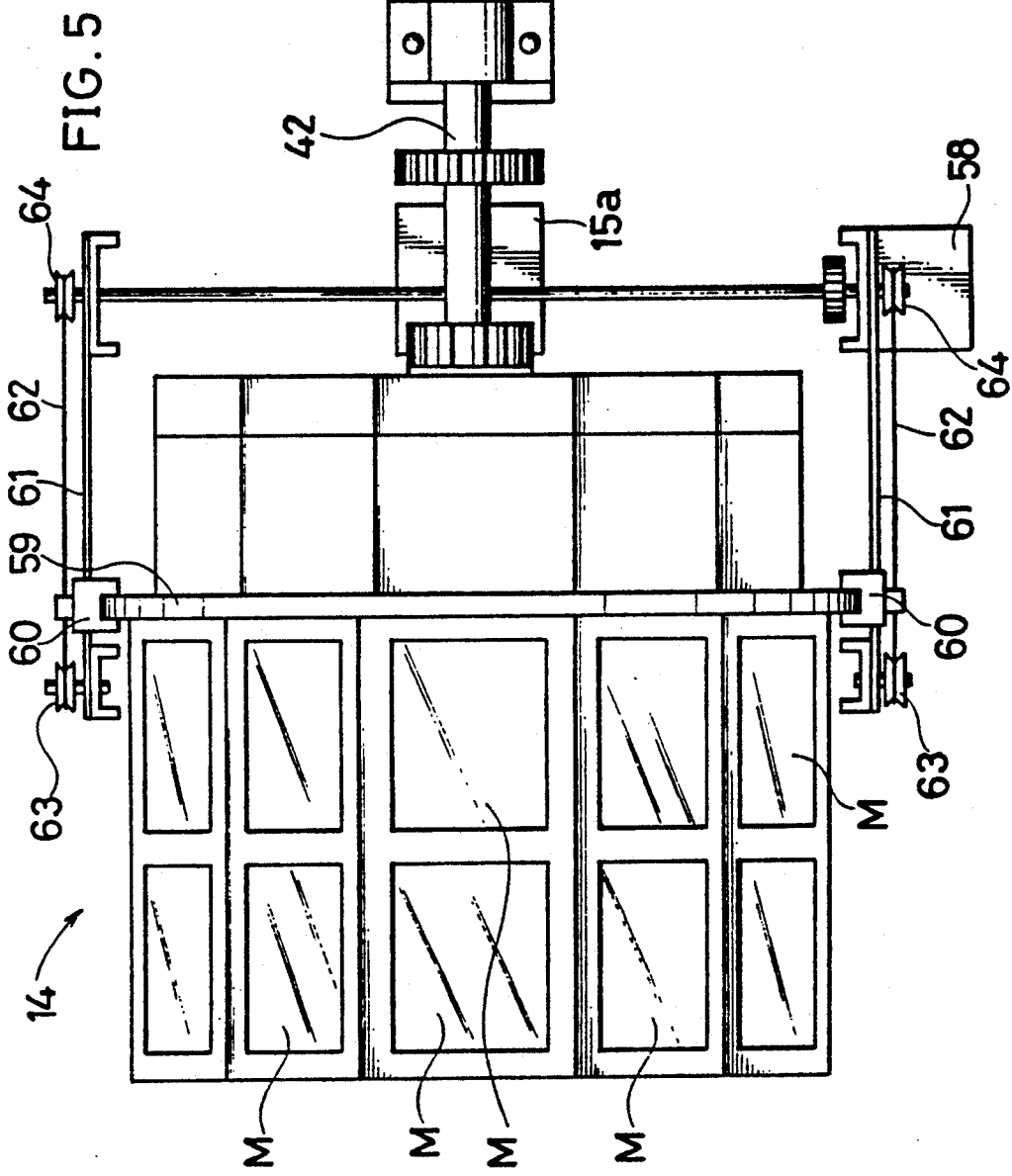
FIG. 5 is a top view showing the drum according to the embodiment of the present invention.
Figure 6:
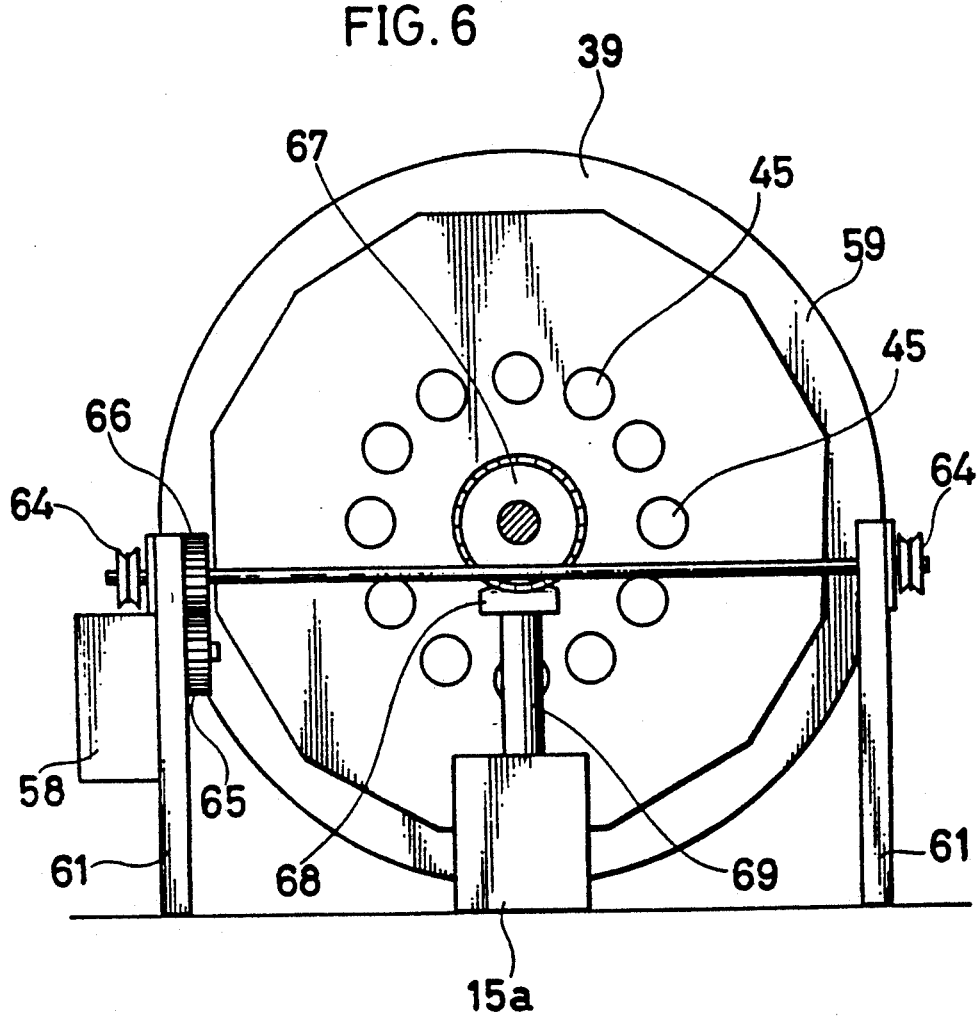
FIG. 6 is a front view showing the drum according to the embodiment of the present invention.
Figure 11:
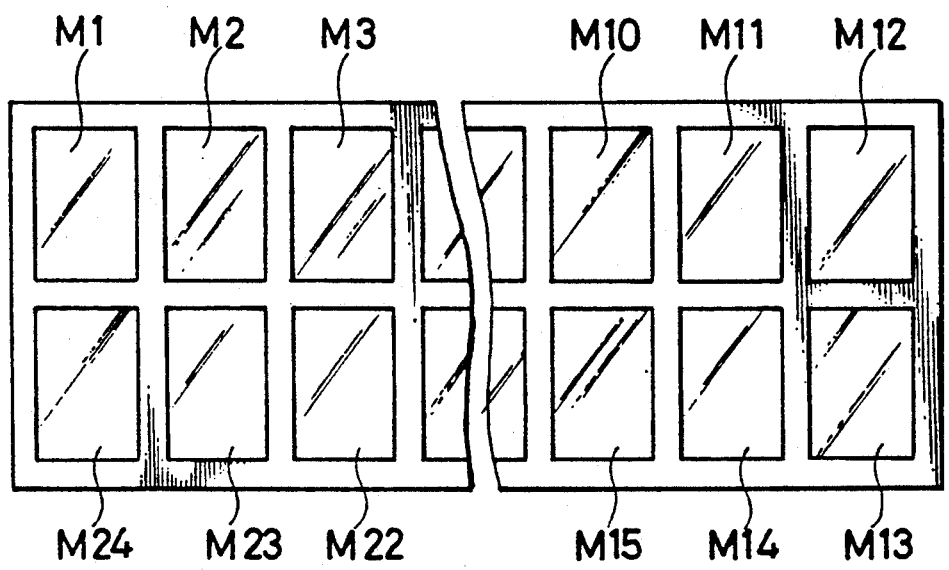
FIG. 11 is a view for explaining the arrangement of liquid crystal cell according to the embodiment of the present invention.

FIG. 2 is a section view showing the drum 14. FIG. 4 is a side view showing the drum 14. FIG. 5 is a top view showing the drum 14. FIG. 6 is a front view showing the drum 14. In FIGS. 2, 4, 5 and 6, the reference numeral 39 denotes a drum body which is a hollow and cylindrical regular dodecahedron and the reference numeral 40 denotes a holder which is a hollow and cylindrical regular dodecahedron. The holder 40 is slidably attached to the outside of the drum body 39. Each peripheral surface of the holder 40 has a window. Each window has two liquid crystal cell M arranged in the axial direction of the drum body 39. More specifically, 24 (2×12) liquid crystal cell M1 to M24 are attached to the holder 40 as shown in FIG. 11.

The reference numeral 41 denotes an opening provided in the central portion on each peripheral surface of the drum body 39. The reference numeral 42 denotes a rotational shaft for rotating the drum body 39. The reference numeral 43 denotes a supporting plate. The reference numeral 44 denotes a bearing for rotatably supporting the drum body 39. The reference numeral 45 denotes a hole provided on the end wall of the drum body 39 for guiding light irradiated by the liquid crystal irradiating lamp 15 to the back of the liquid crystal cell M through the opening 41. The reference numeral 46 denotes a hole provided on the supporting plate 43 for guiding light from the projection zoom lens 16 to the mirror 17.

The reference numeral 47 denotes a CCD camera. The reference numeral 48 denotes a supporting table for the CCD camera 47. The reference numeral 49 denotes a sliding shaft for slidably supporting the supporting table 48. The reference numeral 50 denotes a pinion gear which is engaged with a rack gear (not shown) provided on the back of the supporting table 48. The reference numeral 51 denotes a CCD camera moving motor for driving the pinion gear 50.

Figure 3:
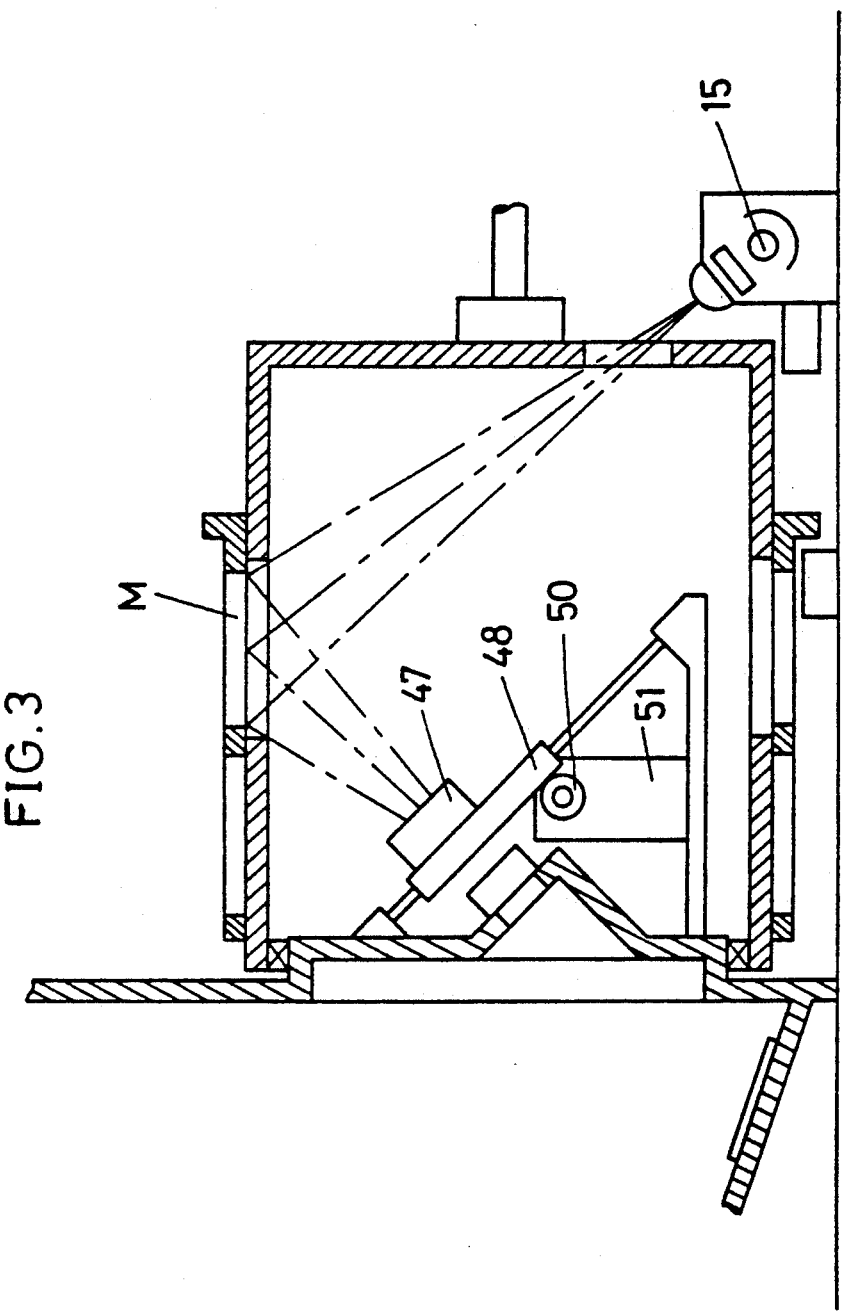
FIG. 3 is a section view showing the operation of the inside of the drum according to the embodiment of the present invention.

When the CCD camera moving motor 51 is driven, the pinion gear 50 is rotated and the supporting table 48 is moved to a position shown in FIG. 3. Consequently, the image of the liquid crystal cell M irradiated by the liquid crystal irradiating lamp 15 is picked up by the CCD camera 47.

The reference numeral 52 denotes a rotational position detecting sensor for detecting a home position when the drum body 39 is being rotated. The reference numeral 53 denotes a moving position detecting sensor for detecting a home position when the holder 40 is being slid. The reference numeral 54 denotes a bearing for rotatably supporting the rotational shaft 42. The reference numeral 55 denotes a drum rotating motor (stepping motor) for rotating the drum body 39. The reference numerals 56 and 57 denote gears for transmitting the rotational force of the motor 55 to the rotational shaft 42. The reference numeral 58 denotes a holder moving motor (stepping motor) for sliding the holder 40 in the direction of an arrow A or B.

The reference numeral 59 denotes a flange provided on the periphery of the holder 40. The reference numeral 60 denotes a sliding piece for rotatably supporting the flange 59 so as to position the holder 40. The reference numeral 61 denotes a sliding table for slidably supporting the sliding piece 60. The reference numeral 62 denotes a wire for moving the sliding piece 60 in the direction of an arrow A or B. The reference numerals 63 and 64 denote pulleys for supporting the wire 62. The reference numerals 65 and 66 denote gears for transmitting the rotational force of the holder moving motor 58 to the wire 62.

Figure 7:
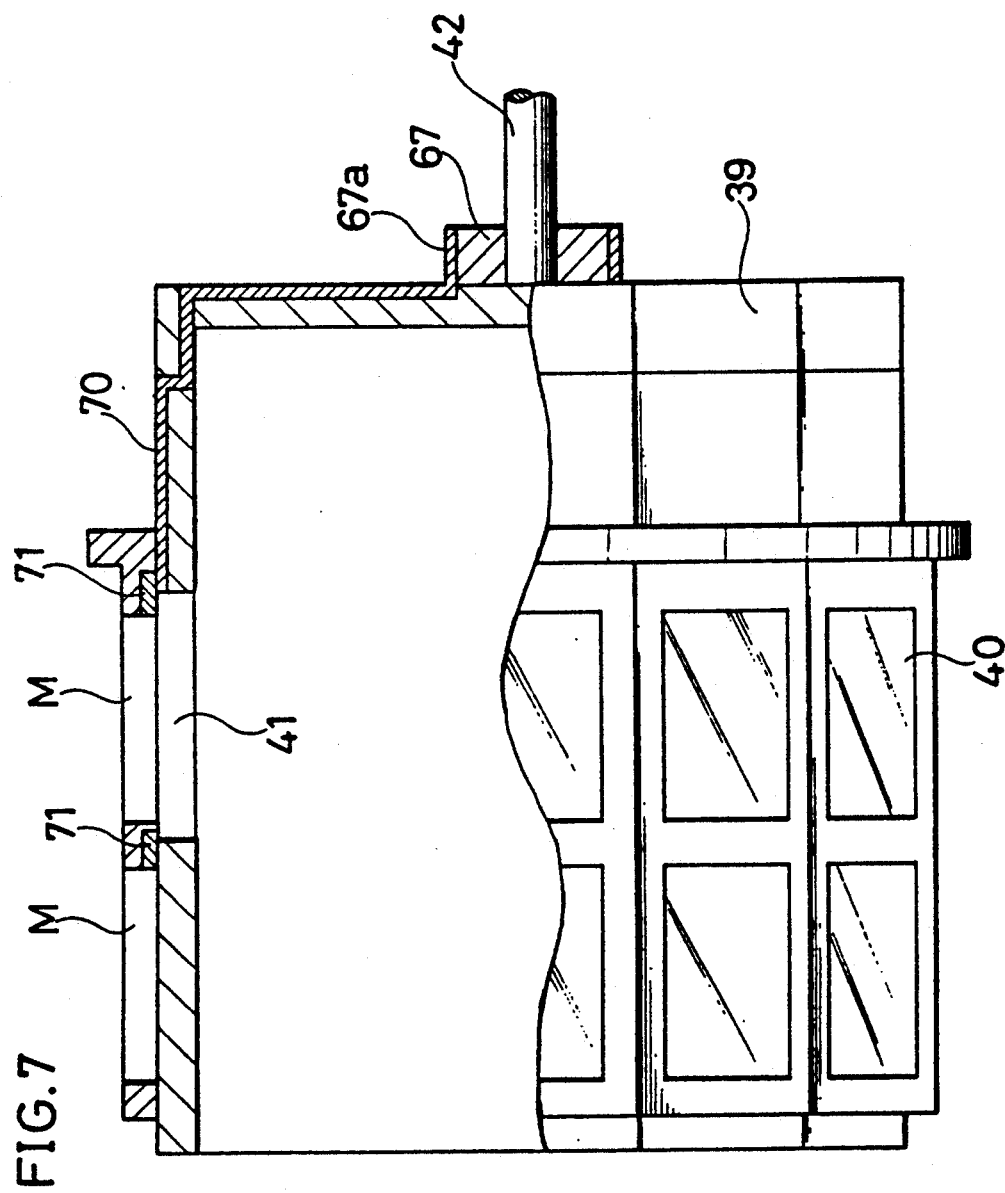
FIG. 7 is a section view showing a main part of the drum according to the embodiment of the present invention.

The reference numeral 67 denotes a commutator fixed to the rotational shaft 42 for feeding electricity to the liquid crystal cell M. The reference numeral 68 denotes a pair of feeding brushes provided so as to come in contact with the commutator 67. The reference numeral 69 denotes a brush supporting member. As shown in FIG. 7, a slider 67a of the commutator 67 is connected to each of terminals 71 of the transparent electrodes 9a and 9b of the liquid crystal cell M by a wiring pattern 70 provided on the drum body 39.

Figure 8:
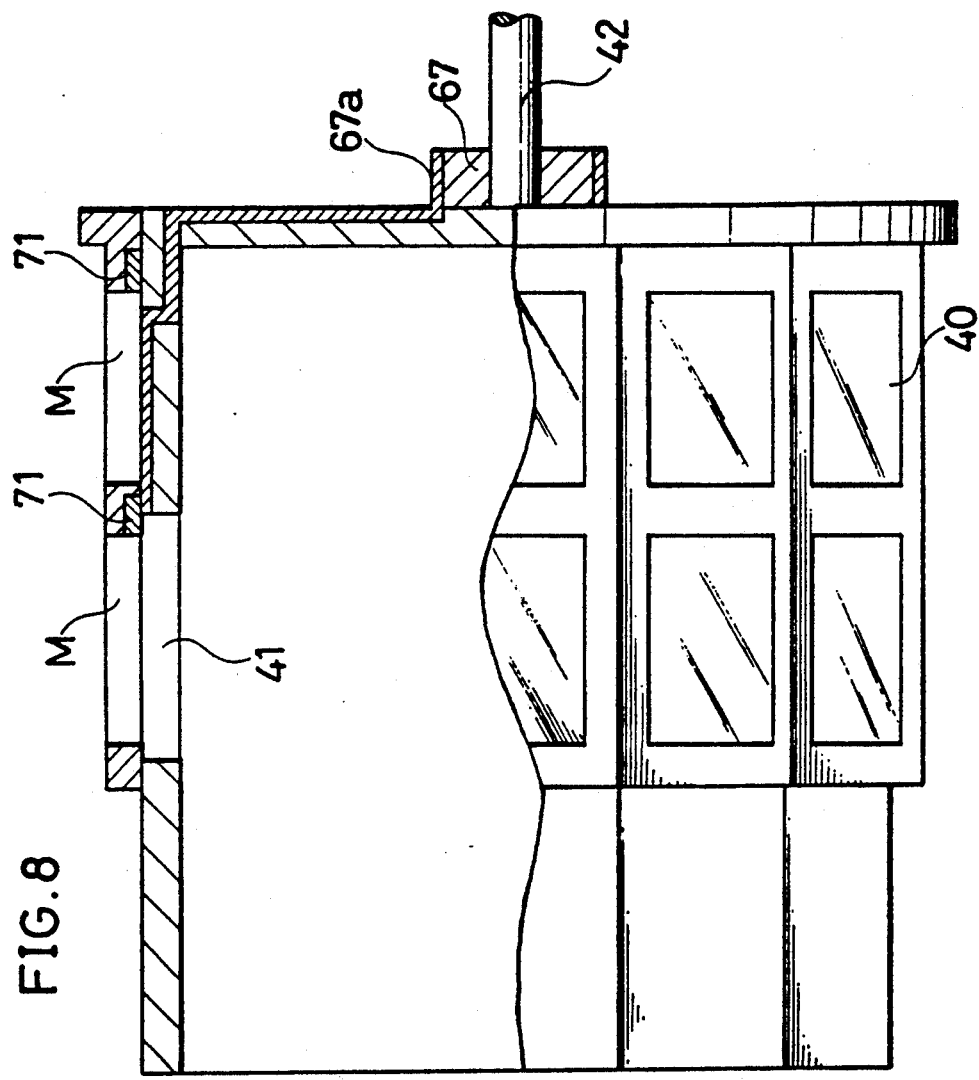
FIG. 8 is a section view showing the main part of the drum according to the embodiment of the present invention.

When the holder 40 is moved as shown in FIG. 8 so that the other liquid crystal cell M is opposed to the opening 41, the connection of the wiring pattern 70 to the liquid crystal cell M is switched. More specifically, the wiring pattern 70 is connected to the liquid crystal cell M located on the opening 41.

Figure 10:
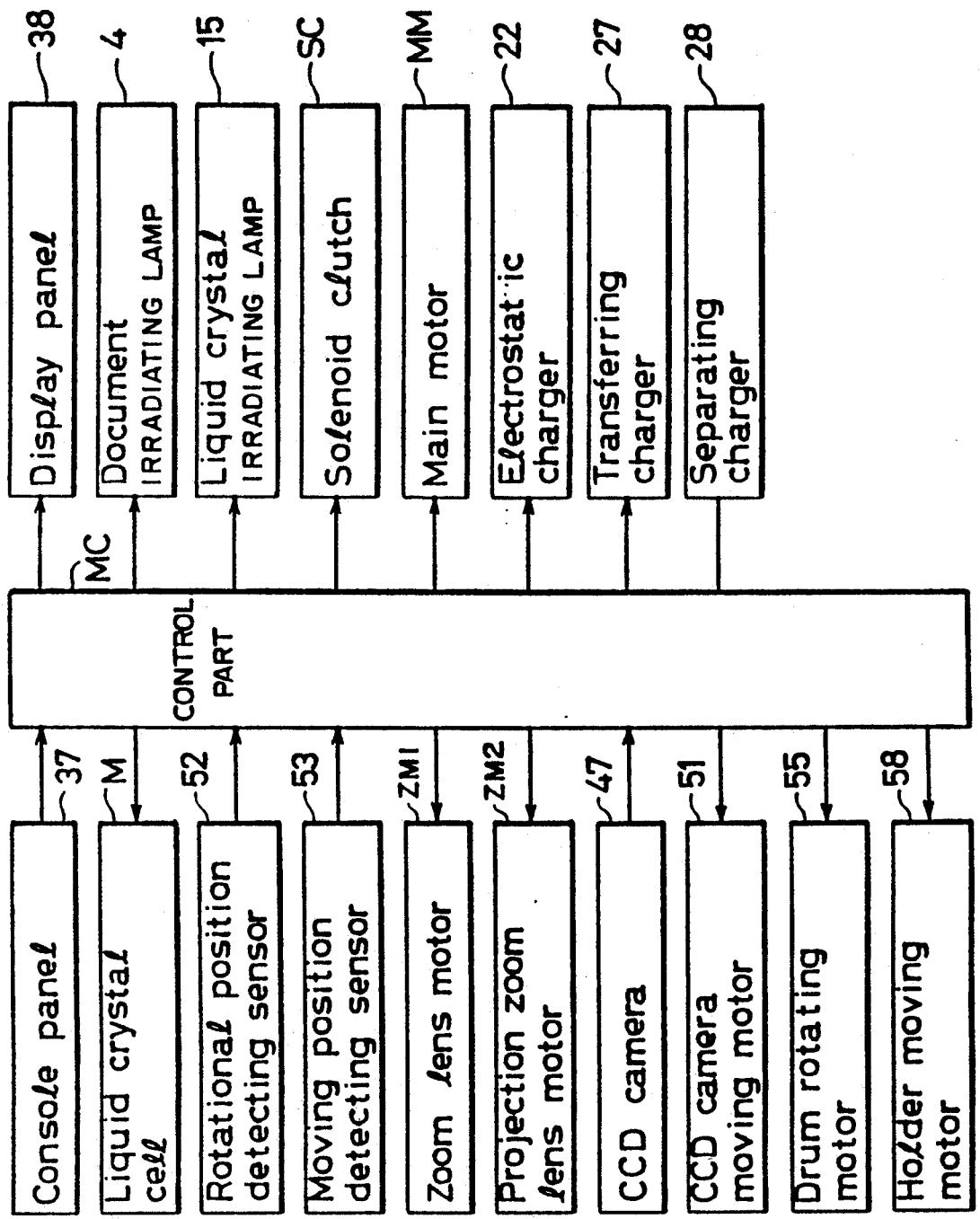
FIG. 10 is a block diagram showing a control circuit according to the embodiment of the present invention.

FIG. 10 is a block diagram showing a main part of a control circuit according to the embodiment shown in FIG. 1. The reference designation MC denotes a control part having a microcomputer therein. The reference designation ZM1 denotes a zoom lens motor for driving the zoom lens 7. The reference designation ZM2 denotes a projection zoom lens motor for driving the projection zoom lens 16. The reference designation MM denotes a main motor for driving various driving parts of the body 1. The reference designation SC denotes a solenoid clutch for turning ON and OFF the transmission of the rotational force of the main motor MM to the driving parts.

On receipt of outputs from the console panel 37, the rotational position detecting sensor 52, the moving position detecting sensor 53, the CCD camera 47 and the like, the control part MC drives the liquid crystal cell M, the zoom lens motor ZM1, the projection zoom lens motor ZM2, the CCD camera moving motor 51, the drum rotating motor 55, the holder moving motor 58, the display panel 38, the document irradiating lamp 4, the liquid crystal irradiating lamp 15, the solenoid clutch SC, the main motor MM, the electrostatic charger 22, the transferring charger 27, the separating charger 28 and the like.

With the above-mentioned structure, the following operations are carried out.

(1) Write (read) image in liquid crystal cell

When the document 3 is placed on the document table 2 and the console panel 37 is operated, the document irradiating lamps 4 and 5 light up so that the image of image light from the document 3 is formed on the surface of the liquid crystal cell M1 by the zoom lens 7 and is then written in the liquid crystal cell M1 which is opposed to the zoom lens 7 (see FIG. 11). When the document 3 placed on the document table 2 is replaced with another one and the console panel 37 is operated, the drum 14 is rotated by an angle of 30 degrees so that the liquid crystal cell M2 is opposed to the zoom lens 7 and a document image is written in the liquid crystal cell M2.

The above-mentioned operation is repeated so that images are written in the liquid crystal cell M1 to M12. In case images are further written in liquid crystal cell subsequent to the liquid crystal cell M12, the guide 40 is slid in the axial direction of the drum 14 until the liquid crystal cell M13 is opposed to the zoom lens 7. Consequently, document images are written in the liquid crystal cell M13 to M24 in the same manner as the foregoing.

(2) Confirm image written in liquid crystal cell

When the console panel 37 is operated, the CCD camera 47 is moved to a position shown in FIG. 3 and the liquid crystal irradiating lamp 15 lights up to irradiate light onto the back of the liquid crystal cell M. Consequently, the images written in the liquid crystal cell M are picked up by the CCD camera 47, converted into electric signals and displayed on the display panel 38.

A user confirms the types of images, the magnification of the zoom lens 7 relative to the size or position of a copy paper, the position of the document 3, the quality of images, the brightness of the document irradiating lamp 4 and liquid crystal irradiating lamp 15, and the like according to images displayed on the display panel 38.

In case any of them should be adjusted as the result of confirmation, images written in the liquid crystal cell M are once erased. After adjustment, the above-mentioned writing operation is repeated so that the images are confirmed.

It is possible to adjust the position of document images with respect to a paper by moving the holder 40 or rotating the drum body 39. A copy magnification can also be adjusted by the projection zoom lens 16.

(3) Read out image onto photoreceptor belt

When an arbitrary liquid crystal cell M is designated in the console panel 37 and "copy start" is inputted, the liquid crystal cell M thus designated is placed opposite to the zoom lens 7, the CCD camera 47 returns to a position shown in FIG. 2 and the liquid crystal irradiating lamp 15 lights up for a predetermined time so as to irradiate light onto the back of the liquid crystal cell M. Image light from the liquid crystal cell M is guided onto the photoreceptor belt 19 through the projection zoom lens 16 and the mirrors 17 and 18 so that an electrostatic latent image is formed.

(4) Copy onto paper

Then, the photoreceptor belt 19 is moved in a direction of an arrow C, and the electrostatic latent image is developed by the developing unit 20 and transferred onto a paper fed from the housing 23. Thereafter, the paper is separated from the photoreceptor belt 19, fixed by the fixing roller 30 and discharged to the outside of the body 1 by the paper discharging roller 31.

In case of reuse, the fixed paper is once housed in the housing 32 by the switching unit 34.

Thus, a copying operation is completed.

In case a plurality of sheets to be copied are set by the console panel 37, there are repeated operations subsequent to the operation of reading out images from the liquid crystal cell M.

Images are written in one of the liquid crystal cell M in the operation (1). Then, the operations (3) and (4) are executed so that there can be carried out a series of operations from reading to copying. At this time, the images of the document which have once been copied are sequentially formed on each liquid crystal cell M. Consequently, the images thus formed can be reused in a both-sided copying step or various copying steps.

Figure 12:
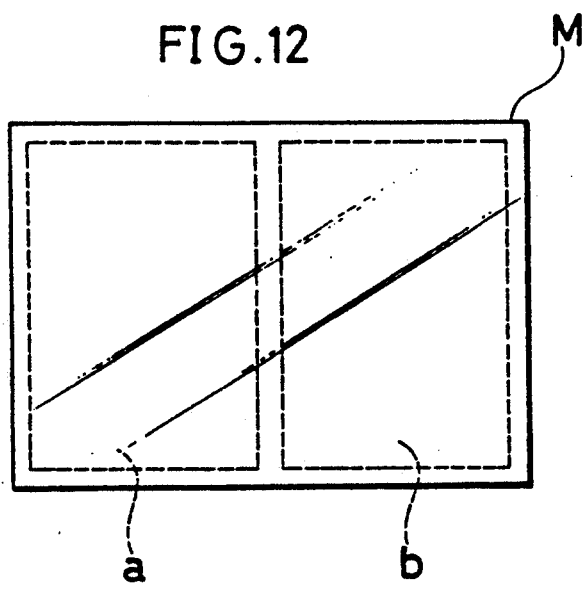
FIG. 12 is a top view showing the image writing area of the liquid crystal cell according to the embodiment of the present invention.

The holder 40 is slid to adjust the position of the liquid crystal cell M which is opposed to the zoom lens 7. Consequently, it is possible to write document images a and b in the image writing area of the liquid crystal cell M and to copy the same on individual papers as shown in FIG. 12. Referring to an A3-sized document, one sheet may be written in the liquid crystal cell M. Referring to an A4-sized document, two sheets may be written in the liquid crystal cell M. Thus, it is possible to increase the number of document images to be formed on the liquid crystal cell M.

When the magnifications of the zoom lens 7 and projection zoom lens 16 are set to m and n respectively, a copy magnification is (m×n). Even if the adjustable ranges of the magnifications m and n are set to conventional ones, i.e., $2 \geq m \geq 0.5$ and $2 \geq n \geq 0.5$, the adjustable range of the copy magnification according to the present embodiment is set to $4 \geq mn \geq 0.25$. As compared with the prior art, the adjustable range can greatly be increased.

When an image N is written in the liquid crystal cell M and the console panel 37 is operated to slide the holder 40 by a predetermined distance as shown in FIG. 13 (A), the image N is shifted in the axial direction of the drum body 39. Consequently, the image N is copied on a paper P with a positional shift so that a binding margin d1 can be ensured as shown in FIG. 13 (B).

When the image N is written in the liquid crystal cell M and the console panel 37 is operated to rotate the drum body 39 by a predetermined angle as shown in FIG. 13 (A), the image N is shifted in the peripheral direction of the drum body 39. Consequently, the image N is copied on the paper P with a positional shift so that a binding margin d2 can be ensured as shown in FIG. 13 (C).

The sliding distance of the holder 40 and the rotary angle of the drum body 39 are set by the stepping motor. Consequently, the binding margins d1 and d2 can be controlled with high precision.

There will be described the operation of superposing and synthesizing (partially deleting) a plurality of document images with reference to a flow chart shown in FIG. 14.

First, a frame erasing document is written in the liquid crystal cell M1 (Step 101). The drum 14 is normally rotated by an angle of 30 degrees (Step 102). The document is replaced with another one (Step 103). Another document is written in the liquid crystal cell M2 (Step 104).

Then, the photoreceptor belt 19 is driven so as to be uniformly charged by the electrostatic charger 22 (Step 105). Thereafter, the photoreceptor belt 19 is stopped (Step 106). The image of the liquid crystal cell M2 is read out to form an electrostatic latent image on the photoreceptor belt 19 (Step 107).

The drum 14 is reversely rotated by an angle of 30 degrees (Step 108). The image of the liquid crystal cell M1 is read out and superposed on the electrostatic latent image formed on the photoreceptor belt 19 so as to form an electrostatic latent image (Step 109). Subsequently, development, transfer and fixation are carried out (Step 110).

When a portion of the photoreceptor belt which is not exposed in Step 107 (a frame portion of the image) is exposed in Step 109, an image in the frame portion is erased. More specifically, a part of the electrostatic latent image formed on the photoreceptor belt by a first document is exposed by the next document so that the image can partially be erased. Thus, it is possible to superpose a plurality of document images so as to arbitrarily delete a part thereof.

There will be described various copying operations which are executed in case an automatic document feeder (ADF) to be generally used is provided on the document table 2.

(A) Single-sided copy of both-sided document

Figure 20:
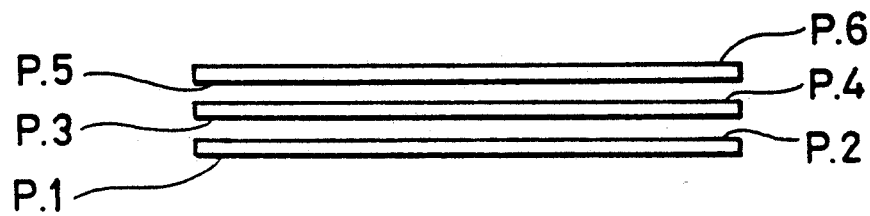
FIG. 20 is a view showing the state in which documents are set.

By way of example, both-sided documents (3 sheets, pages 6 in all) are attached to the automatic document feeder (hereinafter referred to as an ADF) with page 1 placed on the bottom as shown in FIG. 20. The ADF sequentially feeds the documents to the document table 2 from the top side.

Figure 15:
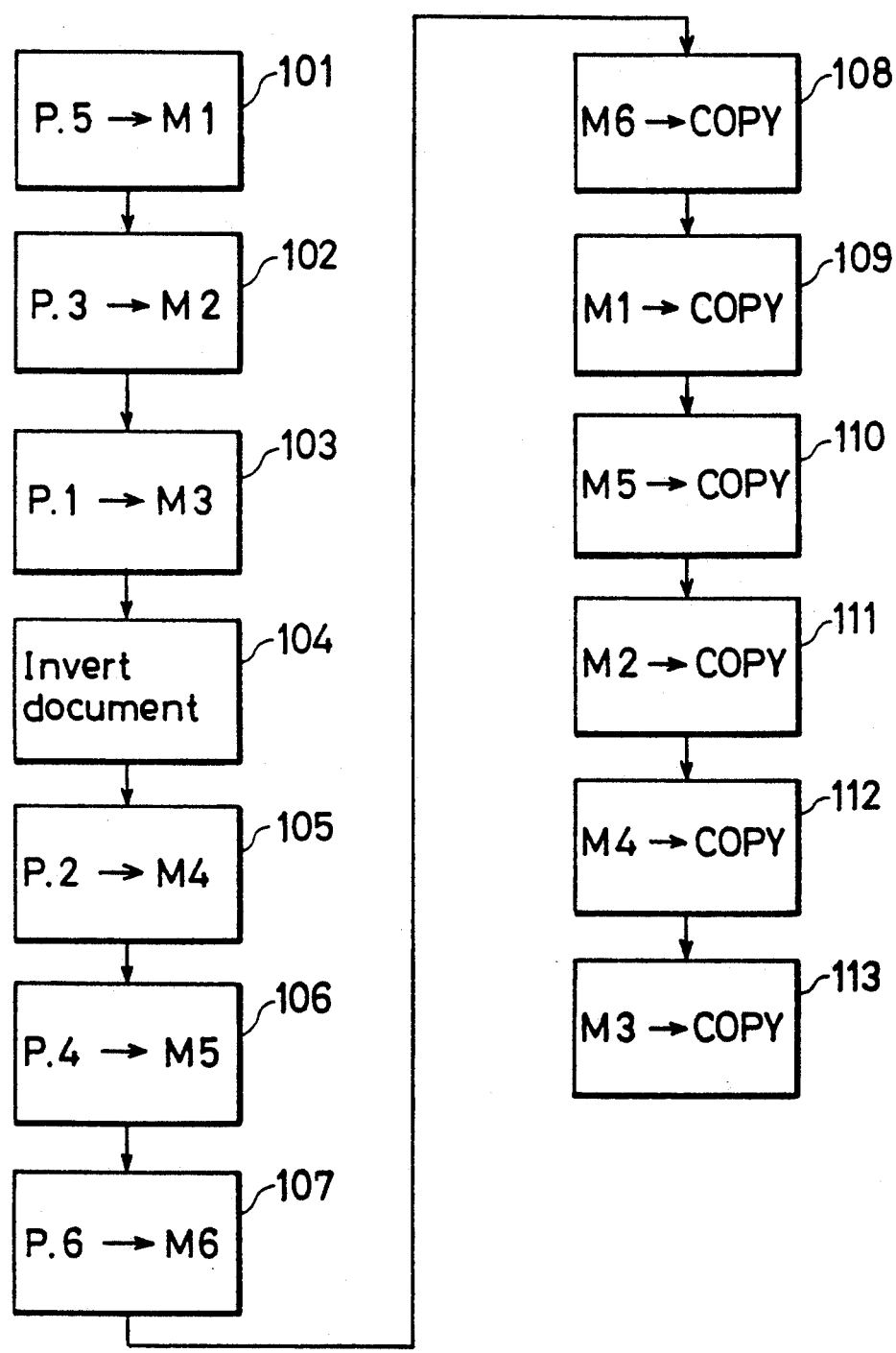
Figure 21:
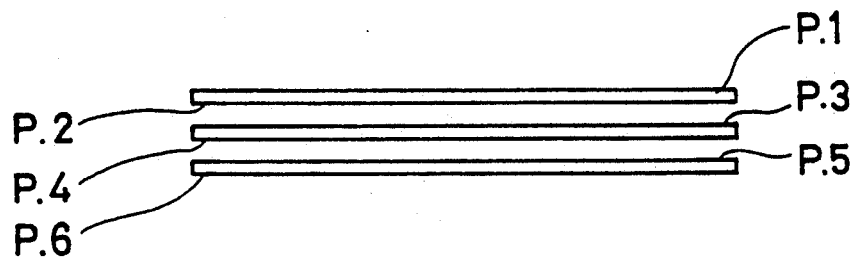
FIG. 21 is a view showing the state in which documents are set.

As shown in a flow chart of FIG. 15, page 5 is first written in the liquid crystal cell M1 (Step 101). Then, pages 3 and 1 are sequentially written in the liquid crystal cell M2 and M3 respectively (Steps 102 and 103). The document discharged from the ADF is inverted as shown in FIG. 21 and is attached to the ADF again (Step 104). Thereafter, pages 2, 4 and 6 are sequentially written in the liquid crystal cell M4, M5 and M6 respectively (Steps 105 to 107).

Figure 22:
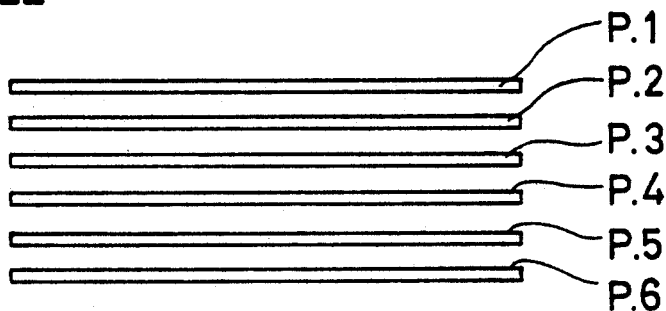
FIG. 22 is a view showing the arrangement of copied papers.

Subsequently, the image of the liquid crystal cell M6 is read out onto the photoreceptor belt 19 so as to execute copying operations such as development, transfer, fixation and the like (Step 108). Images of the liquid crystal cell M1, M5, M2, M4 and M3 are sequentially copied on respective papers (Steps 109 to 113). Consequently, the papers which are subjected to single-sided copy are superposed in the order shown in FIG. 22.

(B) Both-sided copy of both-sided document

Figure 16:
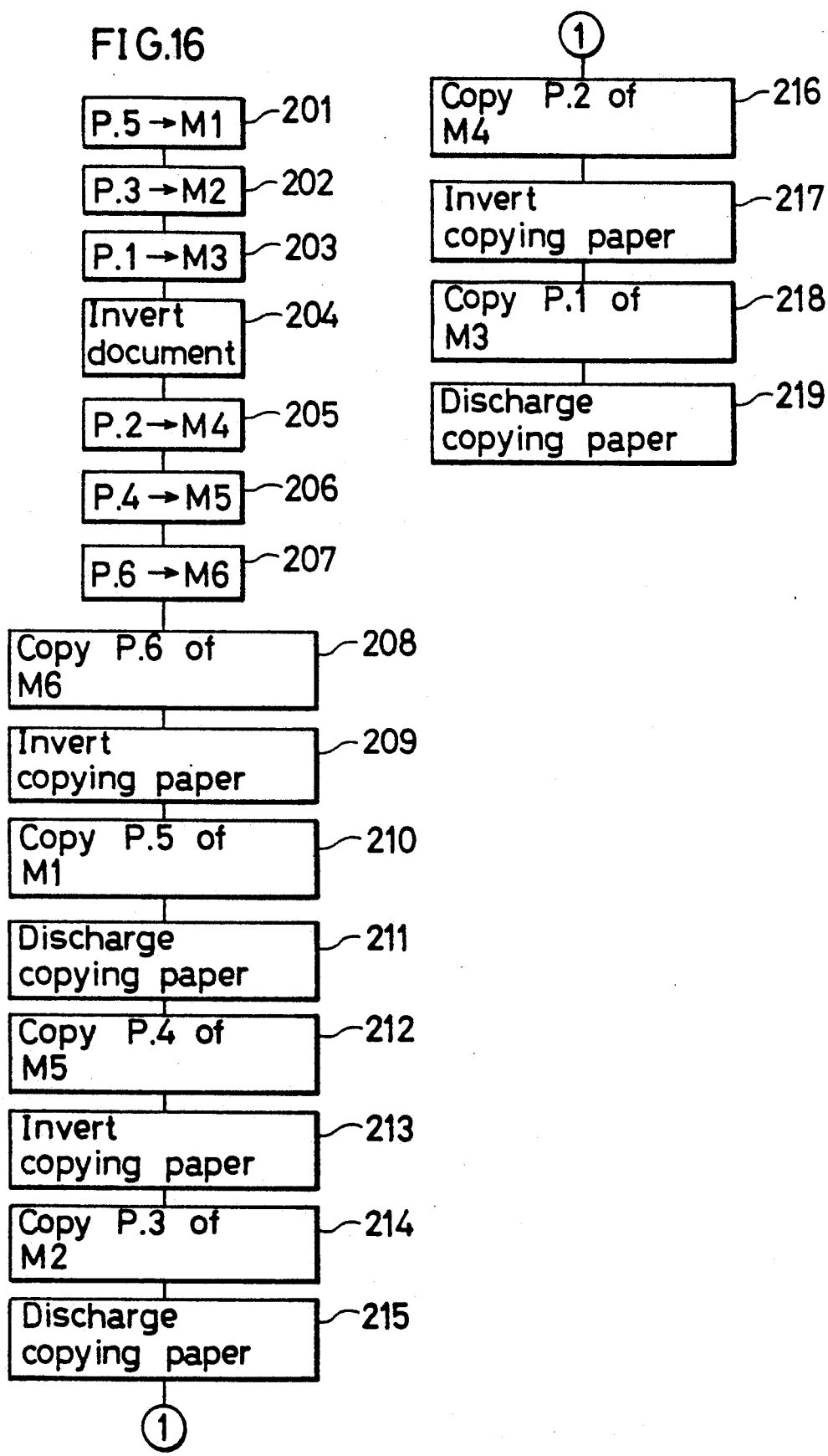

By way of example, both-sided documents (3 sheets, 6 pages in all) are written in the liquid crystal cell M1 to M6 as shown in a flow chart of FIG. 16 (Steps 201 to 207). The image (page 6) of the liquid crystal cell M6 is copied on the paper. Then, the paper is inverted. The image (page 5) of the liquid crystal cell M1 is copied on the back of the paper. Thereafter, the paper is discharged (Steps 208 to 211).

Subsequently, the image (page 4) of the liquid crystal cell M5 is copied on the next paper. The paper is inverted. The image (page 3) of the liquid crystal cell M2 is copied on the back of the paper. Thereafter, the paper is discharged (Steps 212 to 215). Then, the image (page 2) of the liquid crystal cell M4 is copied on the next paper. Then, the paper is inverted. The image (page 1) of the liquid crystal cell M3 is copied on the back of the paper. Thereafter, the paper is discharged (Steps 216 to 219). Thus, both-sided documents can be copied on the respective both sides of the papers.

(C) Copy for altering binding direction of book document

Figure 17:
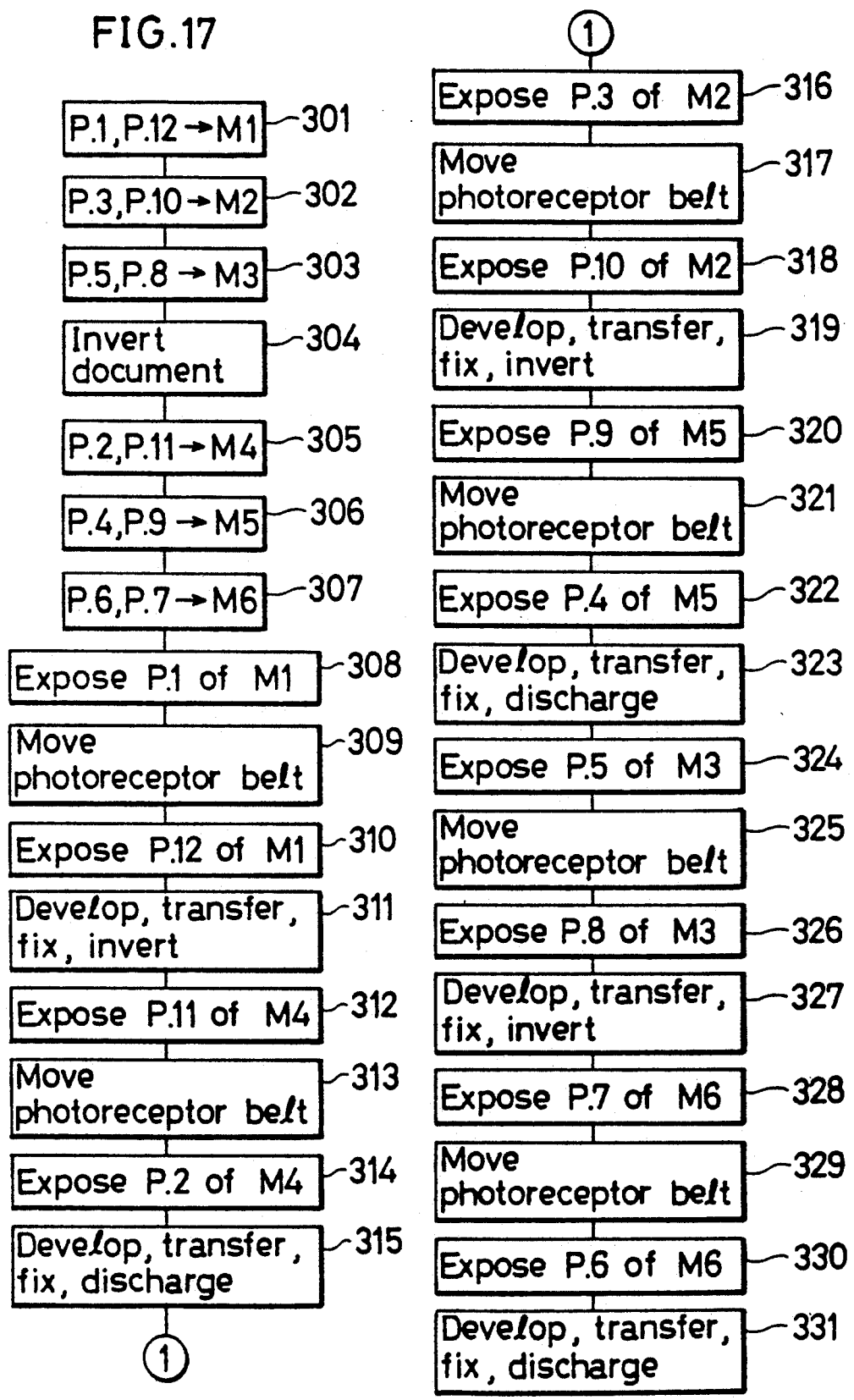
Figure 23:
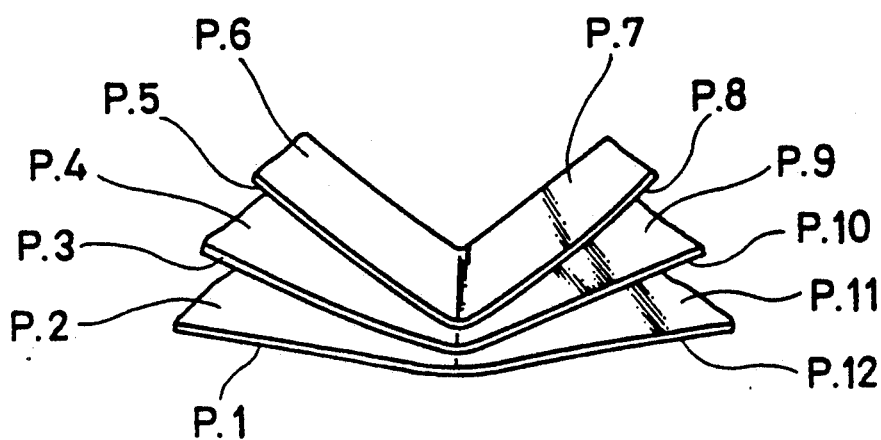
FIG. 23 is a view showing the arrangement of documents.
Figure 24:
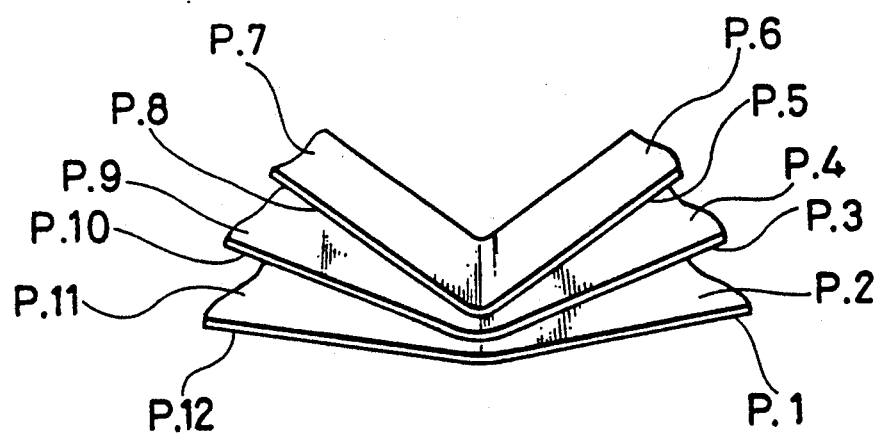
FIG. 24 is a view showing the arrangement of copied papers.

In case left binding book documents (3 sheets, 12 pages in all) shown in FIG. 23 are copied to obtain right binding papers shown in FIG. 24, the staple of the book documents is removed to attach the documents to the ADF and pages 1 and 12 of a first document are written in the liquid crystal cell M1 (Step 301) as shown in a flow chart of FIG. 17.

Subsequently, pages 3 and 10 are written in the liquid crystal cell M2 (Step 302). Pages 5 and 8 are written in the liquid crystal cell M3 (Step 303). The discharged document is inverted and attached to the ADF (Step 304). Then, pages 2 and 11, pages 4 and 9, and pages 6 and 7 are sequentially written in the liquid crystal cell M4, M5 and M6 respectively (Steps 305 to 307).

The image (page 1) of the liquid crystal cell M1 is written in the photoreceptor belt 19. Then, the photoreceptor belt 19 is moved by a width of one page in a direction opposite to an arrow C (Steps 308 and 309). The image (page 12) of the liquid crystal cell M1 is read out onto the photoreceptor belt 19. Then, development, transfer and fixation are carried out. The fixed papers are inverted and caused to stand by (Steps 310 and 311).

The image (page 11) of the liquid crystal cell M4 is read out onto the photoreceptor belt 19. Then, the photoreceptor belt 19 is moved by a width of one page in the direction opposite to an arrow C (Steps 312 and 313). The image (page 2) of the liquid crystal cell M4 is read out onto the photoreceptor belt 19. The image of the photoreceptor belt 19 is developed, and transferred and fixed onto the paper which stands by. Then, the paper is discharged (Steps 314 and 315).

Thus, the positions of pages 1 and 12, and pages 2 and 11 of the first document shown in FIG. 23 are replaced with one another as shown in FIG. 21. In such a manner, both sides of second and third documents are copied respectively (Steps 316 to 331). Thus, the left binding book documents can be copied for right binding. Similarly, right binding documents can be copied for left binding.

(D) Single-sided copy of book document

Figure 18:
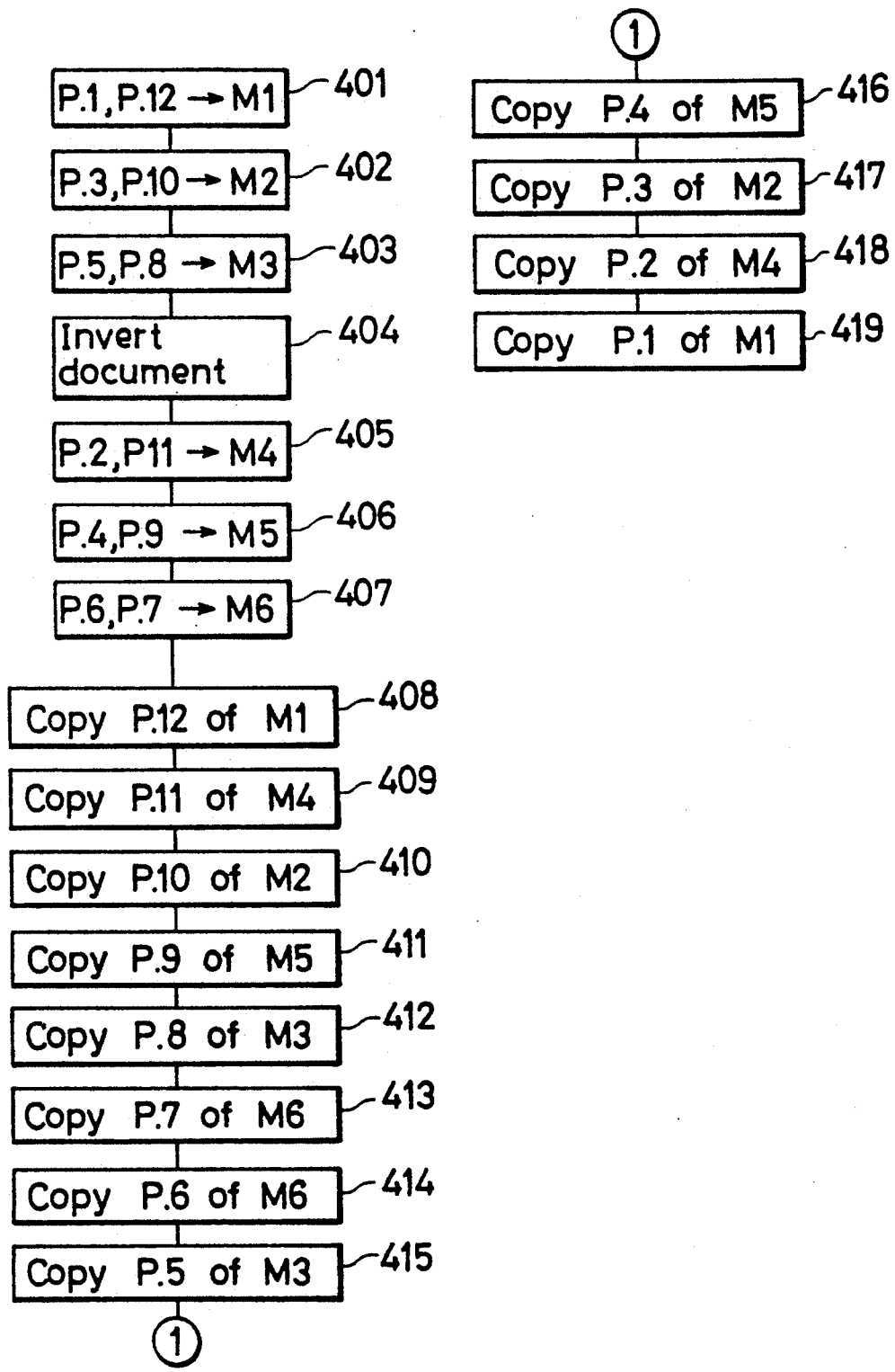

There will be described the case where each page of book documents shown in FIG. 23 is copied on the single side of a paper. With reference to a flow chart shown in FIG. 18, each page of the book documents is written in the liquid crystal cell M1 to M6 in the same manner as in Steps 301 to 307 of FIG. 17 (Steps 401 to 407).

The image (page 12) of the liquid crystal cell M1 is copied on a paper (Step 408). The image (page 11) of the liquid crystal cell M4 is copied on the next paper. Then, the images (pages 10, 9, 8 and 7) of the liquid crystal cell M2, M5, M3 and M6 are sequentially copied on the papers respectively.

Thereafter, the images (pages 6, 5, 4, 3, 2 and 1) of the liquid crystal cell M6, M3, M5, M2, M4 and M1 are sequentially copied on the papers respectively (Steps 409 to 419). Thus, the both-sided book document can be copied on the single side of the paper.

(E) Image synthetic copy

Figure 19:
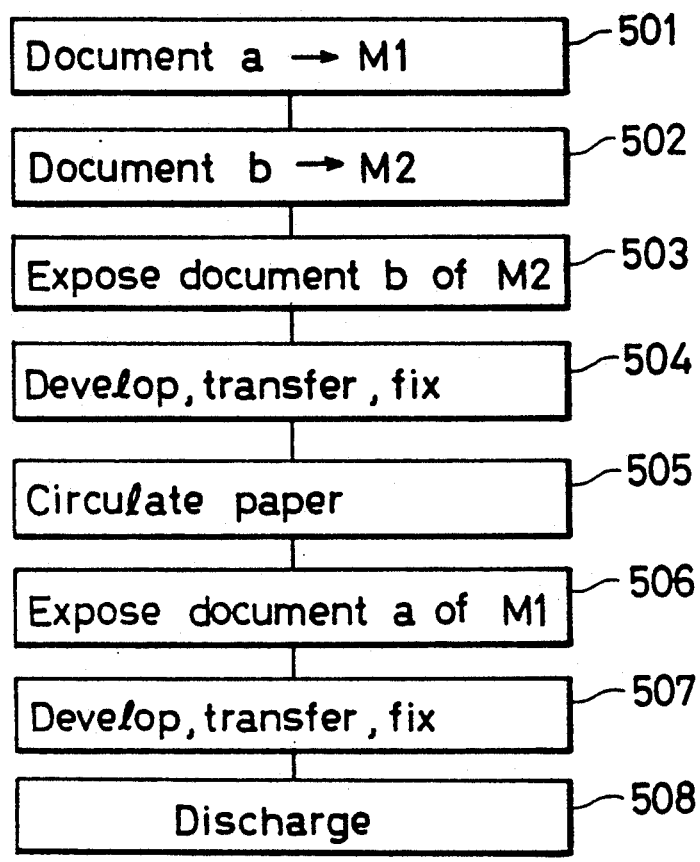

With reference to a flow chart shown in FIG. 19, there will be described copying performed by superposing and synthesizing a plurality of document images. In this case, a document a is written in the liquid crystal cell M1 (Step 501). Then, a document b is written in the liquid crystal cell M2 (Step 502).

The image of the liquid crystal cell M2 is exposed to the photoreceptor belt 19 (Step 503) to carry out development, transfer and fixation (Step 504). A paper is once housed in the housing 32. Subsequently, the image of the liquid crystal cell M1 is exposed to the photoreceptor belt 19 to carry out development. Then, the paper housed in the housing 32 is fed. Transfer and fixation are carried out on the imaging face of the paper again (Steps 505 to 507). Thereafter, the paper is discharged (Step 508). Thus, there can be obtained copy in which the documents a and b are superposed.

According to the present invention, a document image is read in a liquid crystal cell. The image read out from the liquid crystal cell can be copied on a paper without laser beams. Consequently, the structure of an image forming apparatus can be simplified. In addition, the image of the liquid crystal cell can preliminarily be confirmed by display means. Accordingly, copying conditions can be adjusted more easily.

The magnification of an image read in the liquid crystal cell is adjusted by a first zoom lens. The magnification of an image formed on a photoreceptor is adjusted by a second zoom lens. Consequently, the adjustable ranges of copy magnifications can be increased. In addition, images read in a plurality of liquid crystal cell can be superposed for copying. Consequently, images can be synthesized and deleted more easily. Moreover, images can easily be copied on the paper with a positional shift so that arbitrary binding margins can be produced on the paper more easily. Furthermore, it is easy to carry out single-sided copy of both-sided documents, page editing copy of book documents, image superposing copy and the like.

What is claimed is:

1. An image forming apparatus comprising:
   a document table for placing a document to be copied thereon;
   first irradiating means for irradiating first light onto the document on the document table and causing image light to be reflected from the same;
   a drum including a hollow polyhedron cylinder of which facets have windows;
   a liquid crystal cell attached to each window of the drum for receiving image light on the one surface thereof to pick up a document image therein, and for receiving second light on the back surface thereof inside the drum to cause the image to be read out;
   second irradiating means for irradiating second light onto the back surface of the liquid crystal cell and reflecting the same;
   drum driving means for rotating the drum so that the liquid crystal cell provided on each window of the drum can sequentially receive image light reflected by the document from outside the drum on the one surface thereof and second light irradiated by the second irradiating means on the back surface thereof;
   a photoreceptor for receiving second light reflected by the back surface of the liquid crystal cell from the inside of the drum to form an electrostatic latent image corresponding to a document image;
   developing means for developing the electrostatic latent image;
   transferring means for transferring the developed image onto a copy paper; and
   fixing means for fixing the transferred image.

2. The image forming apparatus according to claim 1, wherein the polyhedron cylinder is made movable in a direction of a rotational shaft of the drum.

3. The image forming apparatus according to claim 1, wherein the photoreceptor is formed like an endless belt, and a face for receiving the light reflected by the back of the liquid crystal cell is provided in a direction perpendicular to the document table.

4. The image forming apparatus according to claim 1, further comprising a first zoom lens having variable magnifications for forming the image of the light reflected by the document on the liquid crystal cell, and a second zoom lens having variable magnifications for forming the image of the light reflected by the liquid crystal cell on the photoreceptor.

5. The image forming apparatus according to claim 1, further comprising moving means for moving the polyhedron cylinder in the axial direction of the drum, and control means for priorly rotating the drum by a predetermined angle or moving the polyhedron cylinder by a predetermined distance when an electrostatic latent image is formed on the photoreceptor by the image of the liquid crystal cell.

6. The image forming apparatus according to claim 1, further comprising control means for rotating the drum so as to read a plurality of document images in a plurality of liquid crystal cell, and rotating the drum during the process of read-out so that electrostatic latent images corresponding to a plurality of liquid crystal cell images are superposed on the photoreceptor.

7. The image forming apparatus according to claim 1, further comprising control means for reading out the image of the liquid crystal cell onto the photoreceptor and transferring the same onto the paper in predetermined order after a plurality of documents are sequentially read in the liquid crystal cell.

8. The image forming apparatus according to claim 1, further comprising paper inverting means for inverting the fixed paper and feeding the same to the transferring means, and control means for reading out the image of the liquid crystal cell onto the photoreceptor and transferring the same onto both sides of the paper after a plurality of documents are sequentially read in the liquid crystal cell.

9. The image forming apparatus according to claim 1, further comprising paper feeding means for feeding the fixed paper to the transferring means, and control means for reading out the image of the liquid crystal cell onto the photoreceptor and superposing a plurality of images to be transferred onto the paper after a plurality of documents are sequentially read in the liquid crystal cell.

10. An image forming apparatus comprising:
a document table for placing a document to be copied thereon;
first irradiating means for irradiating first light onto the document on the document table and reflecting the same;
a drum including a hollow polyhedron cylinder of which facets have windows;
a liquid crystal cell attached to each window of the drum for receiving image light on the one surface thereof to pick up a document image therein, and for receiving second light on the back surface thereof to cause the image to be read out;
second irradiating means for irradiating second light onto the back surface of the liquid crystal cell and reflecting the same;
drum driving means for rotating the drum so that the liquid crystal cell provided on each window of the drum can sequentially receive first light reflected by the document on the one surface thereof and second light irradiated by the second irradiating means on the back surface thereof;
a photoreceptor for receiving second light reflected by the back surface of the liquid crystal cell to form an electrostatic latent image corresponding to a document image;
developing means for developing the electrostatic latent image;
transferring means for transferring the developed image onto a copy paper; and
fixing means for fixing the transferred image,
wherein the drum has an opening provided on one of sides for guiding second light, inwardly of the drum, from the second irradiating means to the back surface of the liquid crystal cell, and another opening provided on the other side for guiding light, outwardly of the drum, reflected by the back surface of the liquid crystal cell to the photoreceptor.

11. An image forming apparatus comprising:
a document table for placing a document to be copied thereon;
first irradiating means for irradiating first light onto the document on the document table and reflecting the same;
a drum including a hollow polyhedron cylinder of which facets have windows;
a liquid crystal cell attached to each window of the drum for receiving image light on the one surface thereof to pick up a document image therein, and for receiving second light on the back surface thereof to cause the image to be read out;
second irradiating means for irradiating second light onto the back surface of the liquid crystal cell and reflecting the same;
drum driving means for rotating the drum so that the liquid crystal cell provided on each window of the drum can sequentially receive first light reflected by the document on the one surface thereof and second light irradiated by the second irradiating means on the back surface thereof;
a photoreceptor for receiving second light reflected by the back surface of the liquid crystal cell to form an electrostatic latent image corresponding to a document image;
developing means for developing the electrostatic latent image;
transferring means for transferring the developed image onto a copy paper; and
fixing means for fixing the transferred image,
further comprising conversion means for receiving the light reflected by the back of the liquid crystal cell so as to convert the image of the liquid crystal cell into an electric signal, and display means for receiving the output of the conversion means so as to display the image.

* * * * *